UNITED STATES PATENT OFFICE.

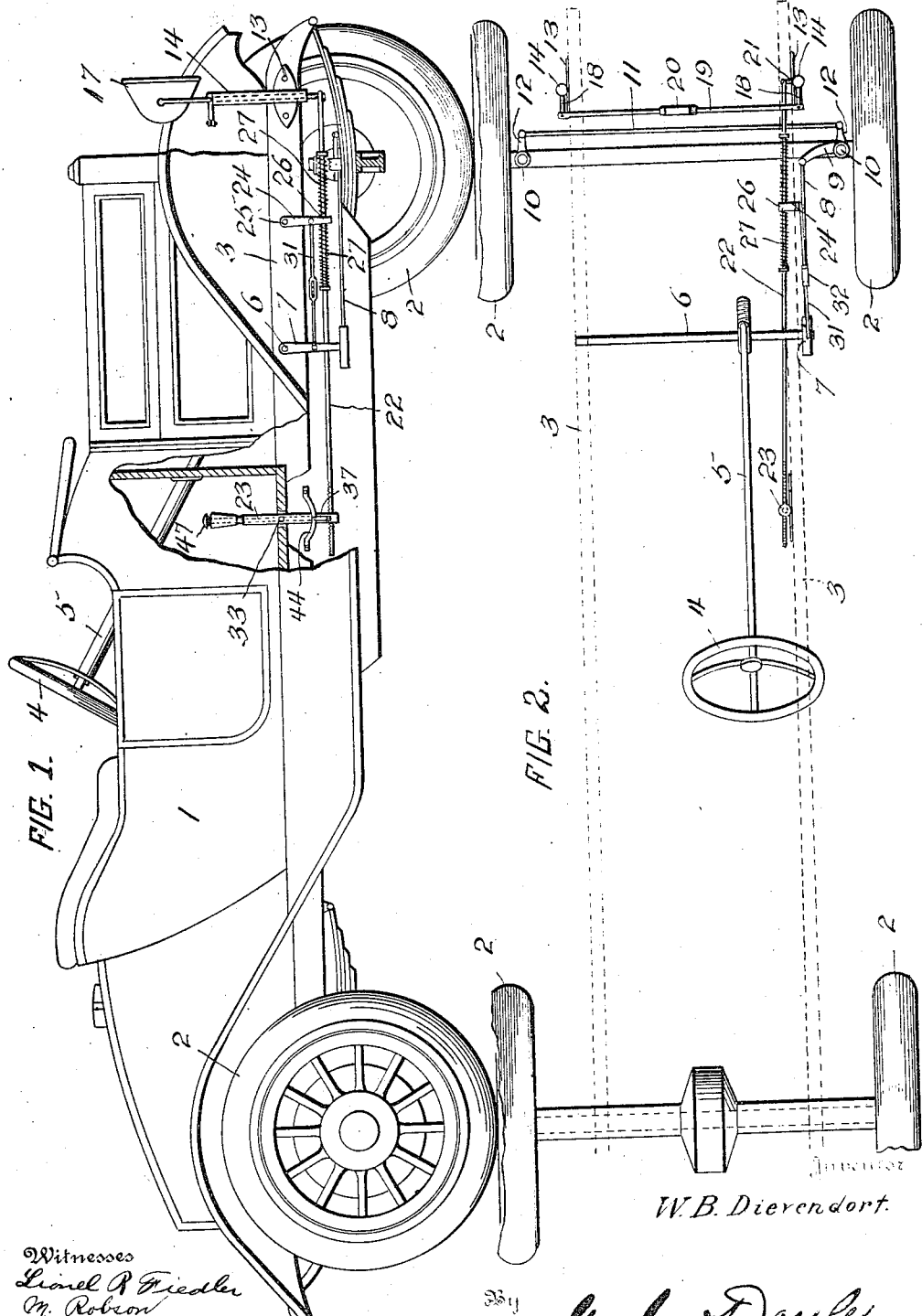

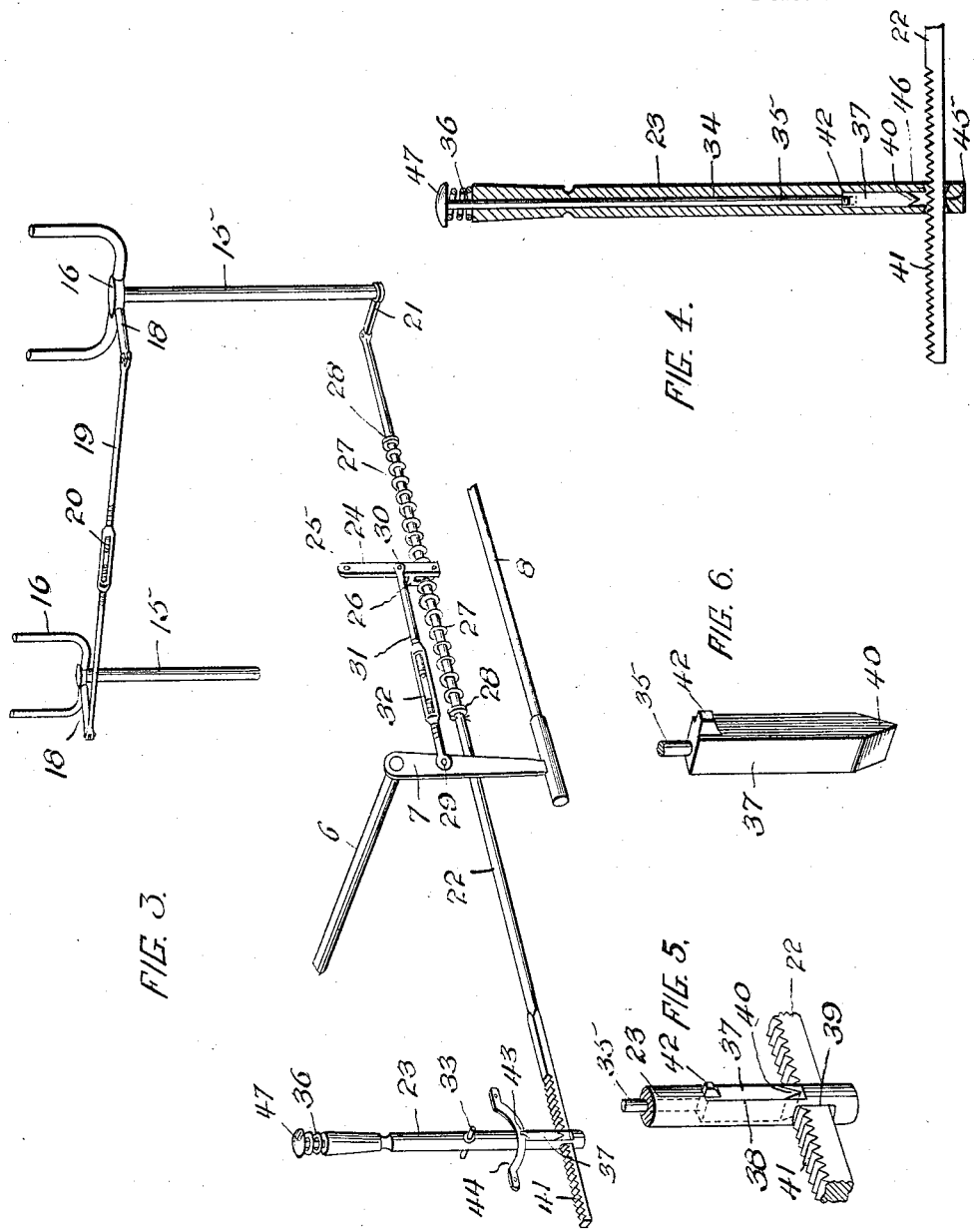

WILLIAM B. DIEVENDORF, OF SPRAKERS, NEW YORK.

DIRIGIBLE LAMP FOR AUTOMOBILES.

1,151,166.   Specification of Letters Patent.   Patented Aug. 24, 1915.

Application filed December 14, 1914.  Serial No. 877,210.

*To all whom it may concern:*

Be it known that I, WILLIAM B. DIEVENDORF, a citizen of the United States, residing at Sprakers, in the county of Montgomery, State of New York, have invented certain new and useful Improvements in Dirigible Lamps for Automobiles, of which the following is a description, reference being had to the accompanying drawings, forming a part hereof.

My invention relates to new and useful improvements in adjustable head-lights for automobiles and other forms of vehicles, and has for its object to provide a simple and durable device in which the head-lights are automatically shifted to cast their light on the road over which the steering wheels are set to travel, and also to provide means whereby the lights may be shifted by lever mechanism independent of the steering gear to throw their light in different directions.

My invention comprises various detail construction, arrangements of parts and combinations of a character to form improvements in construction and operation over that shown and described in my Patent No. 1,079,844, and will be fully described, shown in the drawings and finally claimed.

Similar numerals of reference indicate corresponding parts in the several figures of the drawings, in which—

Figure 1 is a side view partly broken away of an automobile with my attachment in place. Fig. 2 is a plan view of my attachment showing parts of the automobile. Fig. 3 is an enlarged perspective view of my attachment. Fig. 4 is an enlarged vertical section of the operating lever. Fig. 5 is a perspective view of the lower end of the lever to more fully illustrate the manner in which the operating rod is gripped by the lever. Fig. 6 is a detail perspective view of the locking dog at the lower end of the lever.

Reference now being had to the details of the drawings by numerals, 1 indicates the body, 2 the wheels, 3 the frame, 4 the steering wheel, 5 the steering post, 6 the horizontally disposed rock shaft, having the depending arm 7. To the lower end of said arm 7 is secured the rear end of the connecting rod 8, which is secured at its forward end to an arm 9 projecting from one of the steering knuckles 10—10 of any preferred form of automobile.

The usual connection rod 11 is mounted at its ends on projecting arms 12—12 of the knuckles 10, thus causing the steering wheels to operate simultaneously.

All of the above named parts are of a well known character and form no part of this invention. Secured to the frame 3, as shown at 13, are lamp bracket post sockets 14, in which are mounted for horizontal rotation, the lamp bracket posts 15 having at their upper ends lamp forks 16 on which the lamps 17 are mounted, one lamp only being shown in place in Fig. 1. Secured to arms 18 projecting from the lamp forks, is a rod 19, said rod being in two parts connected by a turnbuckle 20 which provides for adjustment of the lamps in relation to each other and provides means for transferring movement of one lamp to the other.

Mounted on the lower end of the post 15 on the side of the automobile on which the arm 7 is located, is a laterally extending arm 21, to the outer end of which is pivotally secured the forward end of a lamp operating rod 22, the rear end of said rod 22 being mounted to normally slide freely through a perforation in the lower end of a hand operated lever 23.

A swing arm 24 mounted at 25 on the frame or other convenient part of the automobile, is bifurcated, as at 26, and rests on either side or straddles the lamp operating rod 22.

Encircling the rod 22 on either side of the arm 24 are coil springs 27—27, the inner ends of said springs bearing against the lower end of the arm 24 and the outer ends bearing against any preferred form of stops 28—28 mounted on rod 22. By this construction, it will be seen that the lower end of arm 24 is connected to the rod 22, but said connection is a flexible connection and one in which the rod 22 may be moved either forwardly or rearwardly by the arm 24, but should the arm 24 be held rigid, the rod 22 may be moved as above against the tension of one or the other of the springs 27.

Mounted at its rear end on depending arm 7 of the steering mechanism, as shown at 29, and at its forward end on arm 24, as shown at 30, is an adjustable link 31, having a turnbuckle 32.

The lamp operating hand lever 23 is pivotally mounted at 33 on any convenient part of the automobile to bring the upper end of same into convenient reach of the operator.

The lever 23 has a central bore 34 and a rod 35 is mounted therein for short vertical movement. A coil spring 36 arranged between the upper end of the lever 23 and a press button 47 secured to the upper end of the rod 35, tends to hold the rod 35 in its upper position.

Secured to the lower end of rod 35 in any preferred manner is a bolt 37, said bolt being of a width sufficient to extend entirely through from side to side of the lever 23, which prevents its turning therein, said bolt 37 being mounted for a slight vertical movement in a cut-away portion 38 formed at right angles immediately above the opening 29 through which the rod 22 extends and is in communication therewith.

The bolt 37 is tapered to a reduced lower end, as shown at 40, for engagement with the notches 41 formed in the upper surface of the rear end of rod 22.

The bolt 35 is further provided near its upper end on one edge with a lug 42 adapted to engage a notch 43 in a segment 44 mounted on the automobile frame, said lug 42 and notch 43 when in engagement, being adapted to hold lever 23 firmly in an upright position.

It will be noted by reference to Fig. 4 that the lower surface of the opening 39 through which the rod 22, under certain conditions, is adapted to slide, is convex or rounded, as at 45, and the upper surface of said opening, as shown at 46, is slightly cut away. This is to provide a slight clearance so that when the bolt 37 is forced down to grip the rod 22, and the lever 23 is swung forwardly or rearwardly, there will be no tendency of the parts to bind and bend the rod 22 up or down, owing to the fact that the said rod is gripped between two edges on which the rod may roll, and still be held firmly against any longitudinal movement thereon.

By the construction shown, it will be seen that in steering the vehicle, the arm 7 is swung and through connecting link 31, the arm 24 will be swung and the springs 27 being of a proper strength, rod 22 will be moved, thereby swinging the lamps in the direction desired. At this time, the rear end of rod 22 will slide freely through the opening 39 in the lever 23.

Should for any reason the operator desire to swing the lamps independent of the above mentioned parts, it is necessary only to force down the button 47 against the tension of the spring 36, which removes the lug 42 from notch 43, at the same time forcing the lower reduced end 40 of the bolt 37 into contact with one of the notches 41 in the upper surface of rod 22, and by swinging the lever 23 against the tension of one of the springs 27, the lamps will be moved as desired.

If the steering mechanism has not been changed during the independent operation of the lamps by the lever 23, the operator by permitting the lever 23 to come to a vertical position, said movement being assisted by the spring 27 which is under tension, and releasing the pressure on button 47, the rod 22 will be maintained in a vertical position by lug 42 reëntering notch 43.

Should a change in the steering mechanism be made while the lower end of lever 23 is gripped to the rod 22, and the operator desires no further independent movement in the lamps, he may release his hold on the lever 23 and button 47, at which time the lever is left to swing with the automatic mechanism with the lug 43 riding on the smooth edge of the segment 44 until said lug 42 comes into alinement with notch 43, when spring 36 will cause said lug to enter the notch and release the rod 22, thereby leaving the lever in an upright position and convenient to the operator the next time he wishes to use it.

Having thus described my invention, what I desire to secure by Letters Patent and wish to claim is:—

1. In combined automatic and manually operated dirigible lights for vehicles, rotary lamp carrying posts connected for simultaneous movement, an arm extending laterally from one post, a longitudinally movable rod secured to the arm, a swinging arm mounted on the vehicle with its free end slidably connected to the rod, springs encircling the rod on either side of the swinging arm having stops at their outer ends secured to the rod, an adjustable link connecting the swinging arm and a longitudinally movable part of the steering mechanism, and a manually operated lever having means for make and break connection with the longitudinally movable rod.

2. In combined automatic and manually operated dirigible lights for vehicles, rotary lamp carrying posts connected for simultaneous movement, an arm extending laterally from one post, a longitudinally movable rod secured to the arm, means for flexibly connecting the longitudinally movable rod and a longitudinally movable part of the steering mechanism, and a manually operated lever pivoted intermediate its ends on the vehicle, and having an opening at its lower end through which the rear end of the longitudinally movable rod is adapted to slide, and means adapted for operation at the top of the lever for gripping the longitudinally movable rod.

This specification signed and witnessed this 12th day of December A. D. 1914.

WILLIAM B. DIEVENDORF.

In the presence of—
EDGAR LEONHARDT,
J. J. VEEDER.

Copies of this patent may be obtained for five cents each, by addressing the "Commissioner of Patents, Washington, D. C."